United States Patent
Simske et al.

(10) Patent No.: US 9,563,830 B2
(45) Date of Patent: Feb. 7, 2017

(54) INCREMENTAL INFORMATION OBJECT WITH AN EMBEDDED INFORMATION REGION

(75) Inventors: Steven J. Simske, Fort Collins, CO (US); A. Marie Vans, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1156 days.

(21) Appl. No.: 13/100,925

(22) Filed: May 4, 2011

(65) Prior Publication Data

US 2012/0280029 A1 Nov. 8, 2012

(51) Int. Cl.
*G06F 17/00* (2006.01)
*G06K 19/06* (2006.01)

(52) U.S. Cl.
CPC .............. *G06K 19/06037* (2013.01)

(58) Field of Classification Search
USPC ........................................ 235/375
See application file for complete search history.

(56) References Cited

U.S. PATENT DOCUMENTS

| | | |
|---|---|---|
| 5,288,986 A | 2/1994 | Pine et al. |
| 6,991,164 B2 | 1/2006 | Lemelson et al. |
| 7,050,650 B2 | 5/2006 | Maurer et al. |
| 7,068,855 B2 | 6/2006 | Simske et al. |
| 7,229,025 B2 | 6/2007 | Sussmeier et al. |
| 7,246,748 B1 * | 7/2007 | Feuerman et al. ....... 235/462.09 |
| 7,333,240 B2 | 2/2008 | Amela et al. |
| 7,349,527 B2 | 3/2008 | Yacoub et al. |
| 7,424,672 B2 | 9/2008 | Simske et al. |
| 7,455,013 B2 | 11/2008 | Simske et al. |
| 7,466,234 B2 | 12/2008 | Simske et al. |
| 7,478,746 B2 | 1/2009 | Cattrone |
| 7,495,552 B2 | 2/2009 | Zhang et al. |
| 7,499,591 B2 | 3/2009 | Simske et al. |
| 7,543,745 B1 | 6/2009 | Simske et al. |
| 7,543,748 B2 | 6/2009 | Kiliccote |
| 7,581,242 B1 | 8/2009 | Oget et al. |
| 7,660,019 B2 | 2/2010 | Gonzalez et al. |
| 7,673,807 B2 | 3/2010 | Simske et al. |
| 7,676,038 B2 | 3/2010 | Simske et al. |
| 7,702,162 B2 | 4/2010 | Cheong et al. |
| 7,712,665 B2 | 5/2010 | Ortiz et al. |
| 7,734,554 B2 | 6/2010 | Simske et al. |
| 7,830,557 B2 | 11/2010 | Simske et al. |
| 7,840,028 B2 | 11/2010 | Simske |
| 7,878,549 B2 | 2/2011 | Simske et al. |
| 7,916,863 B2 | 3/2011 | Simske et al. |

(Continued)

*Primary Examiner* — Rafferty Kelly
(74) *Attorney, Agent, or Firm* — International IP Law Group, PLLC

(57) ABSTRACT

Systems and methods for generating an incremental information object with an embedded information region (IIOEIR) are provided. A method includes analyzing an IIOEIR to determine a first code, wherein the IIOEIR includes a plurality of tiles, and wherein a first set of the plurality of tiles includes a first code and a second set of the plurality of tiles includes a second code. The first code is confirmed, and, if the confirmation succeeds, generating a new code comprising a bitstream, overwriting the bitstream onto the first region. A new second code is generated, wherein the new second code is related to the first code, and the new second code is overwritten onto a second region.

17 Claims, 10 Drawing Sheets

(56) References Cited

U.S. PATENT DOCUMENTS

2006/0016879 A1   1/2006  Kean
2006/0024617 A1   2/2006  Gonzalez et al.
2010/0025472 A1*  2/2010  Morgana et al. ........ 235/462.04
2010/0155479 A1   6/2010  Ming

* cited by examiner

200

300

400

(A)

(B)

600

1100

INCREMENTAL INFORMATION OBJECT WITH AN EMBEDDED INFORMATION REGION

BACKGROUND

Products may include both physical and information-containing items, such as produce, documents, labels, books, software, images, and the like. During the lifecycle of the product, it may progress through a workflow, such as from a manufacturer, through a chain of distributors, and on to a consumer. As used herein, a workflow is a defined set of stages, usually with one or more tasks at each stage, which a product must pass through during its lifecycle. For example, a document may be drafted by a first person, then flow through a number of different editors, prior to being issued to customers or clients in final form. As another example, a manufacturer may package a product for sale to another manufacturer, such as a bundled software package to be sold with a computer.

A bar code may be associated with a product for numerous reasons. For example, a bar code may protect an associated product from counterfeiting and other falsifications. The same bar code may be used throughout the workflow to identify the product. However, this approach does not enable one to monitor the status of the workflow via the bar code. Multiple bar codes may be added, for example, by each entity within a workflow. This may be used to identify the product as it moves from one stage to the next in its workflow. For example, multiple barcodes may be used to confirm the identity of the last party to handle the product. However, the use of multiple bar codes may take a substantial amount of space.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components.

DETAILED DESCRIPTION

Figure 1:
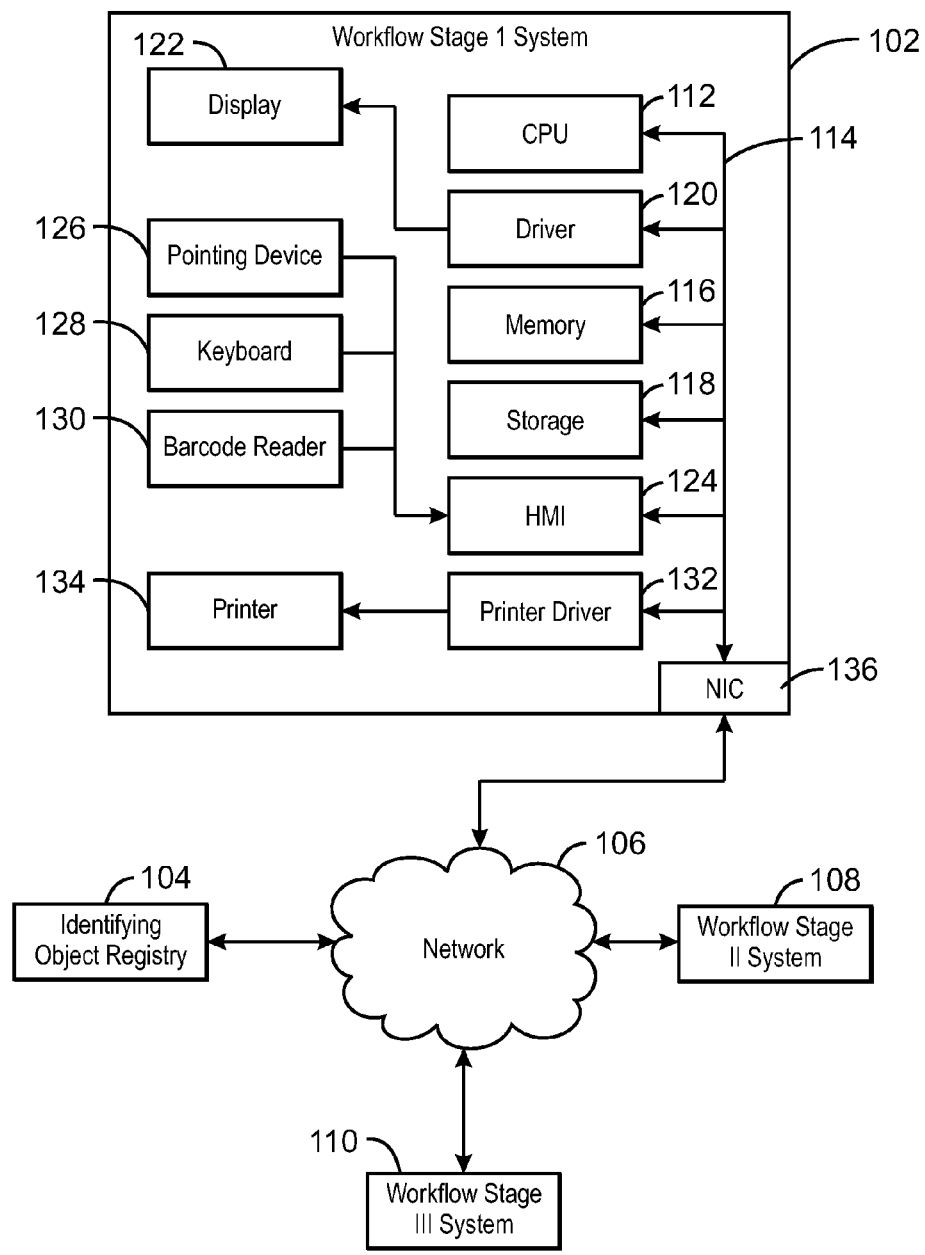
FIG. 1 is a schematic diagram of a system for using an incremental information object with an embedded information region (IIOEIR), in accordance with an embodiment.

Embodiments discussed herein may be used to generate an incremental information object with an embedded information region (IIOEIR). As used herein, IIOEIR is an IIO that may have a first set of tiles that encode a first code and a second set of tiles that encode a second code. The IIEOR is not limited to two codes as additional code regions may include other codes. For example, a third code may be encoded by a third set of tiles in the IIOEIR, wherein the third code represents the relationship between the first code and the second code. The third set of tiles may overlap the second set, the first set, or both.

Effectively, the IIOEIR provides a multi-agent, multi-device capability to a workflow. In addition, the two parts of the IIOEIR may include distinct information streams. That is, each part can belong to an independent mass serialization data stream and can convey workflow information in different manners. As used herein, a mass serialization data stream indicates that no two items in a set or sequence have the same identifier. In addition to being independent, the information in the parts of the IIOEIR can be related to each other in a number of ways. For example, the second code may be related to the first code by replication, scrambling, parity check, compression, digital signature, encryption, or proportion of completion.

As described herein, a workflow is a defined set of stages, usually with one or more tasks at each stage, through which a product may pass during its lifecycle. In an embodiment, the workflow is a process during which documents, information, tasks, or products are passed from one participant to another for action or informative purposes, according to a set of procedural rules.

Workflows may include any number of actions for processing the product. For example, a workflow for an image may include actions such as quality assurance, authentication, forensics, and the like. A supply chain workflow may include actions such as tracking, tracing, inspection, shipping, receiving, recall, among others. Workflows may also include other workflows. For example, a manufacturing workflow may include environmental workflows, sensor data monitoring workflows, compliance workflows, auditing workflows, and statistical workflows, such as inventory, average time in a stage, and the like. Thus, a workflow may be defined as a set of tasks associated with generating, implementing, producing, or distributing a product.

The IIOEIR is a feature or mark carrying information that may be useful for tracing, tracking, state indication, data embedding, authentication, identification, or any other operations that may be used to provide information as a product progresses through the stages of a workflow. As used herein, all of these operations are encompassed by the general term "confirming." For example, confirming may include determining that the information in the first code is consistent with the information in the second code. The IIOEIR can maintain a size, a shape, or both, as the item moves through the workflow, even though additional information may be added at each stage of the workflow. The IIOEIR may be designed taking into account security needs, the type of readers available, and other concerns, such as branding, fraud prevention, robustness to damage, and the like.

The IIOEIR may be a glyph or mark that can be incrementally over-written throughout the workflow to form an identifying object having increasing data content at each stage. For example, the IIOEIR may include a binary barcode, in which the state of each tile in a field of tiles in a two dimensional matrix encodes a bit in a bitstream. The IIOEIR may also include a three dimensional (3D) grayscale barcode, in which a field of tiles in a two dimensional matrix encodes information and a grayscale state is used to encode a third dimension at each tile. As another example, the IIOEIR may include a 3D color barcode, in which a field of tiles in a two dimensional matrix encodes information and a color state is used to encode a third dimension, e.g., multiple bits, at each tile. Thus, the IIOEIR may be considered a set or family of such barcodes, since the IIOEIR includes all of the states from the beginning to the end of the workflow.

Each state of the tiles may be readily distinguished from each other state. As discussed below, the states may include a black or white state, a number of grayscale intensities, from completely white to completely black, or a color. The tiles may include square shaped tiles, rectangular shaped tiles, triangle shaped tiles, rounded tiles, mixed shaped tiles, mixed sized tiles, non-uniformly shaped tiles, or combinations thereof. Each state of the IIOEIR is determined by the set of tiles that have been written to at a given stage of the workflow.

The IIOEIR may be a physical mark on a product, such as a printed document or a label on a package. Further, the IIOEIR may be an electronic object in a document, which may be displayed as a mark on a viewing device. In this embodiment, the IIOEIR may be printed with the product and can appear as a mark on a first page of a document.

The IIOEIR may be read from either the physical object or from the viewing device using any image capture device, such as specialized handheld or mobile device, or a bar code reader. In some embodiments, a virtual bar code reader may be used to read the IIOEIR from an electronic document, without using a physical device. In some embodiments, a software object may locate and extract the image from an electronic document. As used herein, the term "bar code reader" includes all of these devices or techniques.

FIG. 1 is a schematic diagram of a system 100 for using an IIOEIR, in accordance with an embodiment. The workflow may start at a first stage system 102. Any number of systems for stages in the workflow may be included, depending on the workflow. The first stage system 102 may access an identifying object registry 104, for example, over a network 106, to obtain initial codes for the IIOEIR. The network 106 may be a local area network (LAN), a wide area network (WAN), or the Internet, and may include both public and private network segments, such as virtual private networks (VPN). Other information may also be provided, such as a relationship between the information in the first code and the information in the second code, or a stream of bits that may be used to set initial entropy in the IIOEIR, as discussed in further detail below.

The first stage system 102 can be used to create the IIOEIR, for example, by writing a number of entropy bits to the IIOEIR, followed by writing a bitstream generated from the first code provided by the identifying object registry 104 onto a first set of tiles in the IIOEIR, i.e., a first code region. The first stage system 102 can then write the second code onto a second set of tiles in the IIOEIR, i.e., a second code region. Any other codes may be written onto the IIOEIR at that point as well.

As discussed herein, entropy bits are bits set in an IIOEIR to provide an initial complexity, or variability, that may make the codes written onto the IIOEIR harder to guess. The bitstream may be generated using any number of techniques. In an embodiment, a private key associated with the initiator of the first stage of the workflow may be used to encrypt the codes provided by the identifying object registry 104. More generally, a nonce can be used for initialization of the codes in the IIOEIR to prevent known-plaintext attacks on the private key. As used herein, nonce is an abbreviation for "number used once," and is a random or semi-random number, issued during each authentication protocol to help prevent replay attacks based on prior communications. Public key hashing or other nonces could then be used for the subsequent workflow stages. Any number of other techniques to generate the bitstream may be used in various embodiments. In an embodiment, the initial code provided by the identifying object registry 104 may used as the bitstream and may be directly written to the IIOEIR, for example, if all confirmation is performed against the identifying object registry 104. The second code, and subsequent codes, may be generated using various techniques and relationships, as discussed herein.

Other stages of the workflow may have associated systems, such as the stage two system 108 and the stage three system 110 illustrated in FIG. 1. The first stage system 102 may be used to either coordinate the physical transfer of a product to the second stage system 108 or to directly transfer a product in electronic form. Similarly, the stage two system 108 may transfer or coordinate the transfer of the product to the stage three system 110. At each stage, information may be sent to the next stage's system to confirm the IIOEIR, for example, for comparing the information in the first code to the information in the second code, among others. In an embodiment, the system at each stage can confirm the IIOEIR by communicating with the identifying object registry 104.

Any of the stage systems 102, 108, and 110, or the identifying object registry 104, may include units to provide the functionality used to generate the IIOEIR, as shown for the first stage system 102. These units may include a central processing unit (CPU) 112. The CPU 112 may include a single core processor, a multi-core processor, or a cluster of processors, for example, in a cloud computing configuration. The CPU 112 may communicate with other units over a bus 114, which can include a PCI bus, a PCIe bus, an optical bus, or any other suitable type of bus.

A memory 116, such as random access memory (RAM) or read-only memory (ROM), may be used to store operating programs and data configured to implement the methods described herein. As used herein, programs include machine readable code configured to direct a processor to implement various functions. Similarly, a storage system 118 may provide longer term storage for data and programs. The storage system 118 may include, for example, a hard drive, an optical drive, a flash drive, a memory drive, and the like.

Figure 10:
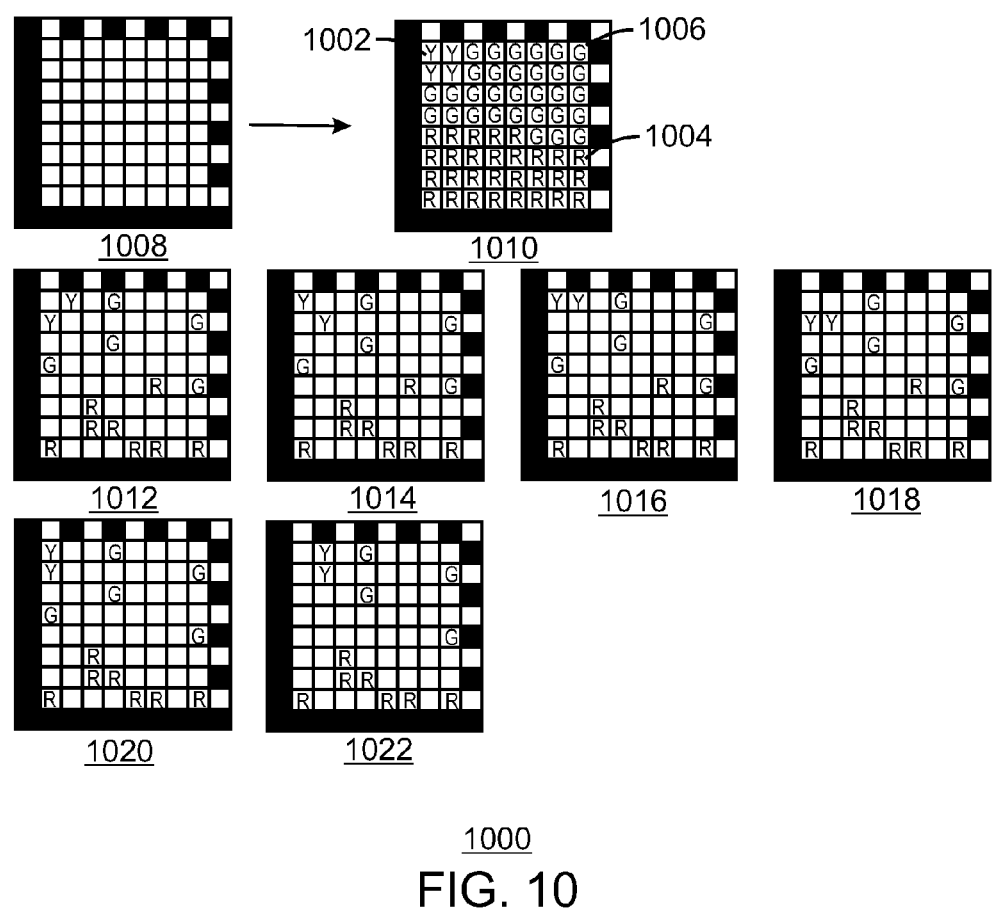
FIG. 10 is a drawing illustrating the use of a third code region to convey information about the relationship between a first code region and a second code region, in accordance with an embodiment.

The memory 116 and storage system 118 provide a non-transitory, computer readable medium for storing programs and data to implement the techniques described herein, as discussed further with respect to FIG. 10.

Other units may also be included to provide further functionality. For example, the stage systems may include a display driver 120 to drive a display 122, which may be used to display the product and the IIOEIR. A human-machine interface (HMI) 124 can be used to interface with a number of input devices, such as a pointing device 126, including, for example, a mouse or touchscreen, among others. The HMI 124 may also provide an interface to a keyboard 128, a barcode reader 130, or both. A printer driver 132 may be used to interface with a printer 134 to print the IIOEIR, the product, or both. The printer 134 may be a general purpose unit, such as a laser printer or an ink jet printer, or may be a dedicated unit configured to overprint an IIOEIR with additional information. In addition, a network interface card (NIC) 136 may be provided to permit the stage systems to access the network, the NIC 136 may include a wired Ethernet interface, a wireless network interface, or a mobile network interface.

A number of possible workflow patterns may be implemented on the system 100 discussed above. For example, the workflow may follow the patterns discussed with respect to FIGS. 2 and 3.

Figure 2:
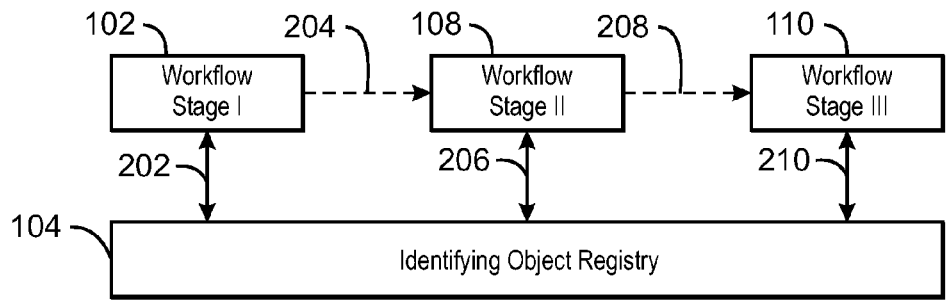
FIG. 2 is block diagram of a workflow using a centralized identifying object registry for confirmation of a product, in accordance with an embodiment.

FIG. 2 is block diagram of a workflow 200 using a centralized identifying object registry for confirmation of a product in accordance with an embodiment. If the registry-based workflow 200 is utilized, a first stage system 102 exchanges information used to generate the IIOEIR with the identifying object registry 104, as indicated by arrow 202. The information 202 may include the rules for generating the IIOEIR, rules relating the first code to the second code, any coded regions used for identifying relationships between the first code and the second code, any coded regions used for carrying additional information, any bits used for adding complexity (e.g., entropy) to the initial IIOEIR, and the like. In an embodiment, the information 202 exchanged includes all of the information needed to write the IIOEIR, with the identifying object registry 104 retaining all coding information.

At the next stage in the workflow, the second stage system 108 receives a package 204 of information from the first stage system 102. The package 204 may include a document and its associated IIOEIR. In the case of a physical product, the package 204 may be physically transferred from one stage to the next in the workflow. The second stage system 108 may then confirm the IIOEIR, for example, by decoding the image to form a bitstream including the first code and then exchanging information 206, including the bitstream, with the identifying object registry 104 for confirmation of the information 206. The second code may be sent as part of the information 206, for use by the identifying object registry 104, or may be used in a previous step to confirm the IIOEIR prior to sending the information 206 to the identifying object registry 104, or both. The information 206 returned from the identifying object registry 104 may include information confirming the IIOEIR and information for generating an IIOEIR for the next stage of the workflow. In an embodiment, the information 206 from the identifying object registry 104 may include all of the information used to directly complete the IIOEIR.

To advance the workflow, the second stage system 108 sends a package 208 on to the third stage system 110. The package 208 may include a physical product as discussed for the package 204 transferred from the first stage system 102 to the second stage system 108. The third stage system 110 can then confirm the IIOEIR by decoding the image to form a bitstream, and exchanging information 210 with the identifying object registry 104, including the bitstream, for confirmation of the IIOEIR. As described for the first stage of the workflow, the second code may be sent with the first code to the identifying object registry 104, or may be used to confirm the IIOEIR prior to sending the information 210 to the identifying object registry 104. In an embodiment, the first code and a protocol to translate into a related code can be shipped with the product.

The techniques are not limited to only three workflow stages, but may include any number of workflow stages, both in series and in parallel. In the embodiment shown in FIG. 2, the addition to the IIOEIR at each stage in the workflow 200 can be performed in conjunction with the identifying object registry 104. However, an independent incremental workflow may be utilized, without backward visibility in the workflow stage-stage transmission, as discussed further with respect to FIG. 3.

Figure 3:
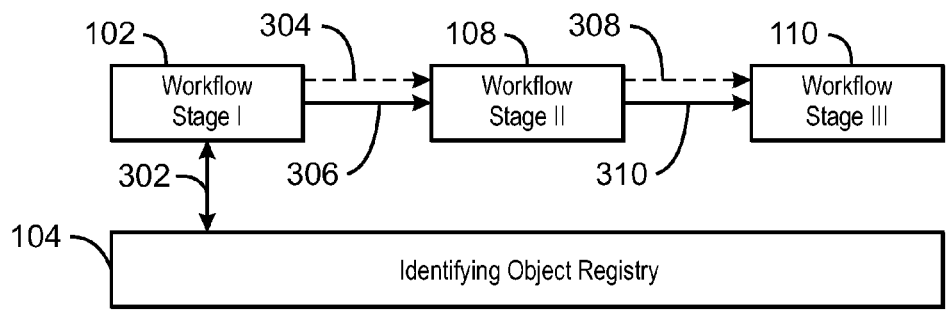
FIG. 3 is block diagram of a workflow that obtains initial codes and instructions from the identifying object registry, and uses the systems at each stage of the workflow to confirm the product, in accordance with an embodiment.

FIG. 3 is block diagram of a workflow 300 that obtains initial codes and instructions from the identifying object registry 104, and uses the systems at each stage of the workflow to confirm the product, in accordance with an embodiment. In this embodiment, the first stage system 102 exchanges information 302 with the identifying object registry 104 to create the IIOEIR. As described with respect to FIG. 2, the information 302 may include the rules for generating the IIOEIR, rules relating the first code to the second code, any additional codes, any bits used for adding entropy to the initial IIOEIR, and the like. In addition, the information 302 may include rules for creating an IIOEIR at each stage of the workflow 300. In some embodiments, these rules may include creating a hash code of the bitstream decoded from a code region of the current object, using a private key to encrypt the hash code, writing a bitstream of the hash code over the associated code region of the current IIOEIR, and sending the hash code on to the next work stage along with a public key for decryption. Other information may also be included, such as an encrypted version of the starting code, e.g., the code provided to the previous stage of the workflow, among others. The information 302 may also include rules for creating the second, or subsequent codes, such as rules for incrementally changing the second code to reflect the information in the first code, among others.

The IIOEIR at each stage of the workflow can be deduced when the starting point, such as the initial or first code, is known, as most workflows have a small and well-defined set of stages. Workflow exceptions may occur, however, when extra steps have been added, for example, in a non-legitimate progression. Similarly, exceptions may occur when available space for over writing successive codes becomes sparse during the workflow. In such instances, the stage of the workflow may not be deduced, and the IIOEIR may fail the confirmation process. Further, the first code may not be consistent with the second code, indicating a potential attempt at fraud, among other problems, leading to a failure in the confirmation process. Any number of other techniques may be used to create an IIOEIR at each stage of the workflow 300.

At the next stage, the stage two system 108 receives the product 304 and the information 306 that may be used to confirm the IIOEIR on the product. For example, the information 306 may include an intelligent hash of the previous state of the IIOEIR from the first stage system 102, among other items, such as the rules used to create the second code. In this embodiment, the stage systems may not have access to the identifying object registry 104, and the addition to the IIOEIR at each stage in the workflow will be performed in conjunction with initial instructions received from the identifying object registry 104. This embodiment may be useful, for example, when the distribution network organization is proprietary.

After the work at stage two is completed, the stage two system 108 may forward the product 308, including the IIOEIR, to the stage three system 110, along with the information 310 needed to confirm that earlier added information is correct.

As described herein, the identifying object registry 104 can include hardware, such as processors, memory, and storage. Further, the identifying object registry 104 and each of the workflow stage systems 102, 108, and 110, may include software for generating an incrementally completed IIOEIR. Access to the identifying object registry 104 may be secure, for example, requiring a login and password or other authorization methods, such as biometric validation of identity, possession of a secure token, and the like. In an embodiment, the identifying object registry 104 may be unsecure, e.g., being publicly accessible.

In some embodiments, the system 100 may be hosted by a cloud computing network, which may be a virtualized bank of computers including servers that enable Internet-based computing. Shared resources, software, and information may be provided to various computing devices through the cloud computing network. The computing devices may include the workflow stage systems 102, 108, or 110, which may be stationary, such as desktop computers, or mobile, such as laptop computers, netbooks, cellular phones, personal digital assistants (PDAs), and the like. The cloud computing network may allow a registry system provider to deliver access to the identifying object registry 104 and its various services to subscribers online via another web service or software, such as a web browser. Software and data associated with the cloud computing network may be stored on servers and their associated memory.

Thus, as a result of the workflow described above, the IIOEIR contains an incrementally increasing amount of information at each stage of the workflow. This is discussed with respect to FIG. 4.

Figure 4:
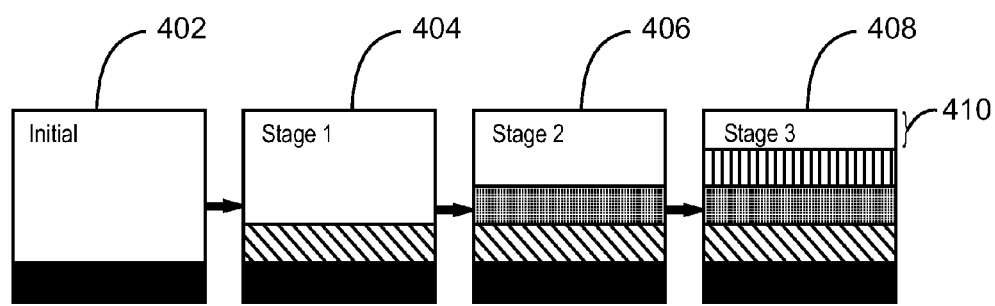
FIG. 4 is a schematic of information content in an IIOEIR at different stages of a workflow, in accordance with an embodiment.

FIG. 4 is a schematic 400 of information content in an IIOEIR at different stages of a workflow, in accordance with an embodiment. The IIOEIR can have an initial number of bits set to provide entropy to the first code and to other codes, making it less probable that the codes may be guessed. These entropy bits provide a first amount 402 of information in the IIOEIR. At the completion of the first stage of the workflow at block 404, the IIOEIR is overwritten and contains a second and increased amount of information in the IIOEIR, which is transferred to the second stage of the workflow. After completion of the second stage of the workflow, at block 406, the IIOEIR has a third and further increased amount of information. At block 408, the third stage of the workflow is completed, and the IIOEIR contains a fourth amount of information. A portion 410 of the bits that may be written are left blank in both the first code and in other codes, providing entropy for the final IIOEIR. To see the advantages provided by a three-dimensional IIO, it is useful to examine a simple two-dimensional IIO, as discussed with respect to FIG. 5.

Two-Dimensional (2D) IIOs

Figure 5:
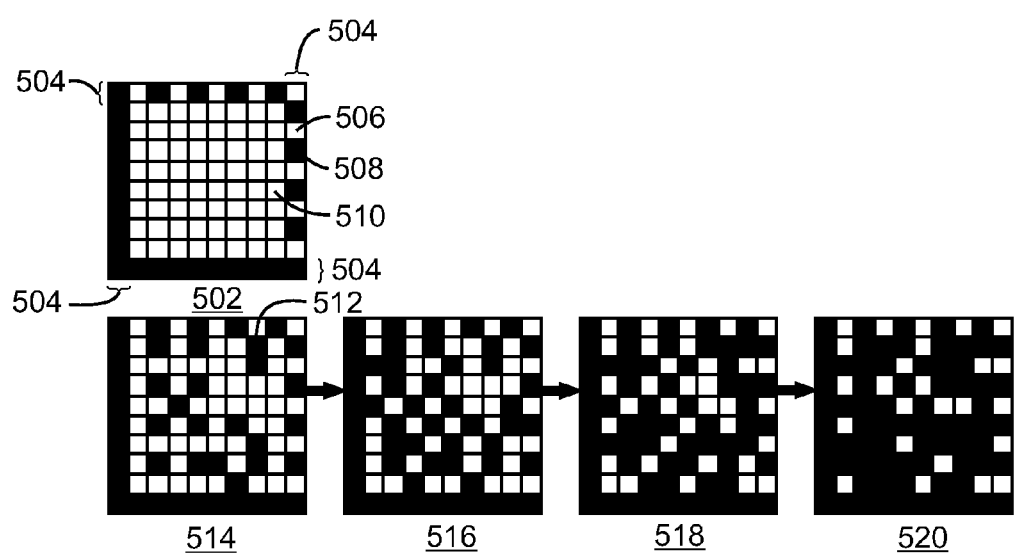
FIG. 5 is a schematic showing an example of changes to tiles that may occur in a two-dimensional (2D) IIO at each stage in a workflow, in accordance with an embodiment.

FIG. 5 is a schematic 500 showing an example of changes to tiles that may occur in a two-dimensional (2D) IIO at each stage in a workflow. A blank IIO 502 shows the presence of non-payload indicia (NPI), which can be used to convey basic identification and calibration information, including such information as the type of IIO being used, the number of gray values or color values that may be present, an arrangement for the gray values, and the like. In this example, the NPI include the perimeter tiles 504 on all four sides of the 2D IIO. The alternating light tiles 506 and dark tiles 508 along two edges of the perimeter, and the dark tiles placed along the other two sides, provide calibration marks for adjustment of the image, as described herein. The blank tiles 510 inside the 2D IIO are the payload tiles which may be changed from light to dark to indicate the presence of a bit value of one.

A number of entropy bits 512, for example, sixteen in this illustration, may be set to a value of one within the blank 2D IIO 502 to create an initial 2D IIO 514. The entropy bits 512 increase the complexity of the initial 2D IIO 514, making it less probable that a code may be guessed. The initial 2D IIO 514 is passed to the first stage of the workflow, which writes the first bitstream over the initial 2D IIO 512, providing a first stage 2D IIO 516. A second code may also be written into a second code region at this and subsequent stages, for example, to represent the amount of data stored in the 2D IIO 516, among other information.

The writing to each of the code regions may be performed by any number of schemes. For example, the writing may be performed by initializing both a tile counter and a bit pointer to zero. The value of the first bit in the stream is compared to the value of the first tile. If the first tile is light (zero) and the first bit is one, the value of the first tile is changed to dark (one), and both counters are incremented. If the first tile is dark (one), and the first bit is one, the tile counter is incremented until a light tile is reached, at which point the value of the tile is changed to dark (one). At that point, both counters are incremented. If the first bit is zero, the tile counter and the bit counter are both incremented without changes to tiles. The process is repeated until all of the bitstream is used. If the tiles are completely examined, i.e., the tile counter exceeds the number of tiles, the tile counter is reset to zero, and the process continues until all bits are written.

The first stage 2D IIO 516 is then passed to a second stage of a workflow with the product. At the second stage of the workflow, the first stage 2D IIO 516 may be confirmed, for example, by comparing information in the first code to information in a second code, by sending a code to the identifying object registry 104, or both. After confirmation, the first code may be used in the creation of a second stage 2D IIO 518, for example, by writing a bitstream over the first stage 2D IIO 516. The process is repeated at the third stage resulting in the third stage 2D IIO 520.

A 2D IIO using light to dark binary transitions may provide a large number of state transitions, making the probability of guessing the one correct next state or falsifying the IIO very low. For example, the statistical probability associated with a stage i in the workflow may be defined as $P_i$. Thus, the number of residual (0 bits) at the end of the workflow is $N_{RB}$, and the number of initial unwritten bits is $N_{IU}$. The values of $N_{RB}$ and $N_{IU}$ used to achieve a particular value for $P_i$ are governed by the formula of Eqn. 1.

$$\frac{N_{IU}!}{(N_{IU}-N_{RB})!N_{RB}!} \geq \prod_i P_i \qquad \text{Eqn. 1}$$

In Eqn. 1, the exclamation mark (!) represents the factorial operator. $P_i$ may be determined from the required statistical confidence that a next step cannot be randomly guessed multiplied by the total number of IIOs of the current state that will be readable in the supply chain, among others. If the IIO is unique at step i-1, then the total number of IIOs of the current state is 1.

As an example, consider a case in which a 2D IIO is initially 25% filled with black tiles and upon completion of its workflow it is 75% filled with black tiles. For purposes of this example, it can be assumed that there are six stages in the workflow: a manufacturer, four distributors, and an end retailer. Further, for the purposes of the supply chain, it can be assumed that the desired statistical $P_i$ values are $10^9$ for manufacturer and the four distributors and $10^3$ for the retailer. Thus, the $$\prod_i P_i$$

value is about $10^{48}$.

Suppose a number of bits in each of a number of bitstreams are represented by {g,h,i,j,k,l}, wherein each of the bitstreams are used to move the product through a particular stage of the workflow. The final number of bits, $N_{RB}$, is assumed to be ⅓ of the original unwritten bits, $N_{IU}$. Accordingly, the governing equations for each step in this workflow are:

$$\frac{N_{IU}!}{g!(N_{IU}-g)!} \geq 10^9 \quad \text{Eqn. 2}$$

$$\frac{(N_{IU}-g)!}{h!(N_{IU}-g-h)!} \geq 10^9 \quad \text{Eqn. 3}$$

$$\frac{(N_{IU}-g-h)!}{i!(N_{IU}-g-h-i)!} \geq 10^9 \quad \text{Eqn. 4}$$

$$\frac{(N_{IU}-g-h-i)!}{j!(N_{IU}-g-h-i-j)!} \geq 10^9 \quad \text{Eqn. 5}$$

$$\frac{(N_{IU}-g-h-i-j)!}{k!(N_{IU}-g-h-i-j-k)!} \geq 10^9 \quad \text{Eqn. 6}$$

$$\frac{(N_{IU}-g-h-i-j-k)!}{l!(N_{IU}-g-h-i-j-k-l)!} \geq 10^3 \quad \text{Eqn. 7}$$

Note that $(N_{IU}-g-h-i-j-k-l)!$ in Eqn. 7 is the same as $N_{RB}!$, and so simplifying Equations 2-7 together gives Eqn. 8.

$$\frac{N_{IU}!}{g!h!i!j!k!l!N_{RB}!} \geq 10^{48} \quad \text{Eqn. 8}$$

Eqn. 8 is in similar form to Eqn. 1. With Eqn. 8, we can compute the overall number of bits required in the 2D barcode (and by extension at each step in the workflow).

Assuming g!=h!=i!=j!=k!, the equation simplifies to:

$$\frac{N_{IU}!}{(g!)^5 l! N_{RB}!} \geq 10^{48} \quad \text{Eqn. 9}$$

Even with governing Eqns. (2)-(9), there are still a large set of solutions to this problem. It can be assumed that g≤h≤i≤j≤k, since they represent the number of open bits to achieve a given number of bits at a particular stage. Further, k>>l in this particular example. However, it can be determined from above that with N payload elements (bits), there are $2^N$ different states of the overall payload, and, so, the minimum number for N is such that $2^N \geq 10^{48}$ or more and, thus, N≥160. Because barcodes are generally represented as N×N where N is an even number, N=14 has been selected for this example, in other words, giving a tile area of 14×14 for the information payload, i.e., not including tiles used for NPI. This provides $2^{192} = 6.277 \times 10^{57}$ states, which is sufficient to accommodate the state changes {g,h,i,j,k} above, but not enough to accommodate the initial fill and final fill tiles, for example, used for the entropy bits. Thus, a 2D security code may be selected with a 16×16 matrix of 256 tiles. In this state, 32 tiles may be filled as the starting condition and 224 filled as the final fill. This means there are 192 bits to fill in between, with an additional statistical advantage of having 224 to choose from on the first step {g}.

To match the desired probabilities, the steps {g,h,i,j,k} may be given 36 bits each, with {l} as 12 as an initial guess for the last step. Thus, for the last step, {l}, 44 remaining open tiles can move to 32 open tiles, and so the governing statistics are 44!/12!32!=2.1×10¹⁰, which is well above the required $10^3$. For {k}, the governing statistics are 80!/36!44!=7.2×10²², which is well above the required $10^9$. For {g,h,i,j}, the statistics are even better—for {j} it is 116!/36!80!=1.27×10³⁰, for {i} it is 1.0×10³⁵, for {h} it is 5.5×10³⁸, and for {g} it is 5.5×10⁴¹. This demonstrates that the number of state transitions is much higher than the number of states. In this case, Eqn. 10 applies.

$$\frac{N_{IU}!}{(g!)^5 l! N_{RB}!} = 6.23 \times 10^{178} \quad \text{Eqn. 10}$$

A smaller 2D IIO may also be used. For example, if the 2D IIO is limited to a 12×12 matrix of payload tiles, $N_u$ may be selected as 136, so there are $3.76 \times 10^{12}$ initial states using 8 bits to define the initial state, and $2.09 \times 10^{13}$ final states using 16 bits to define the final state. The remaining 120 bits for {g,h,i,j,k,l} use {22,22,22,22,22,10} bits each, providing $1.28 \times 10^{25}$, $1.8 \times 10^{23}$, $9.2 \times 10^{20}$, $8.6 \times 10^{17}$, $2.74 \times 10^{13}$ and $5.1 \times 10^6$ state transitions, respectively. So, here, for this smaller 2D IIO Eqn. 11 applies.

$$\frac{N_{IU}!}{(g!)^5 l! N_{RB}!} = 2.69 \times 10^{107} \quad \text{Eqn. 11}$$

Another way to obtain a smaller IIO is to encode multiple bits into each tile. In an embodiment, this is performed by using multiple levels of darkness or multiple colors to represent levels in a single tile, increasing the number of bits each tile represents. This is further discussed with respect to FIG. 6.

Figure 6:
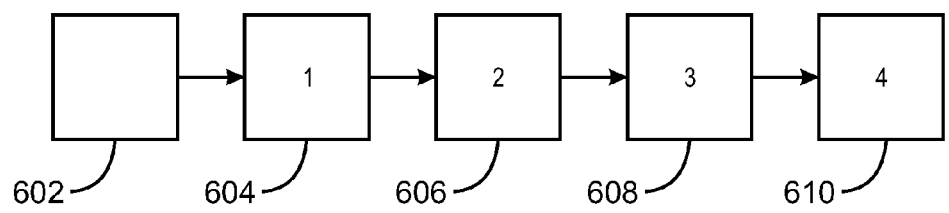
FIG. 6 is a schematic illustrating the use of a multi-level gray or color scale to increase the information content of a single tile, in accordance with an embodiment.
Figure 6:
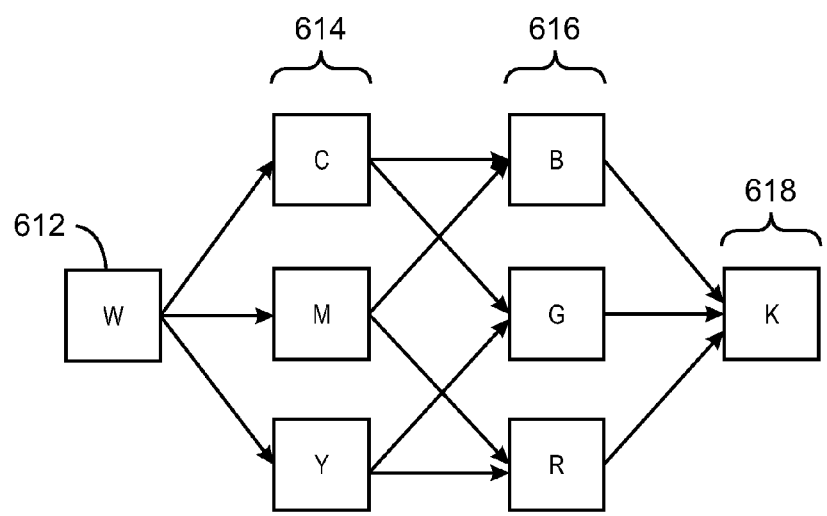

FIG. 6 is a schematic 600 illustrating the use of a multi-level gray or color scale to increase the information content of a single tile 602 or 612, in accordance with an embodiment. In FIG. 6(A), each time a bit value of one is written to the tile, the grayscale intensity may be increased by 25%, for example, going from white to 25% gray at the first bit, as indicated by the second tile "1" 604. Another bit value of one may increment the intensity to 50% gray for the second bit in a third tile "2" 606, to 75% gray for the third bit in a third tile "3" 608, to 100% gray, i.e., black, for the fourth bit in a fourth tile "4" 610.

The use of the grayscale changes the IIO to a three dimensional IIO. It can be noted that the grayscale values are not limited to 4 intensity levels, as any number of intensity levels may be used, so long as they can be clearly distinguished. In general, N possible states for a single tile may store Log(N)/Log(2) bits in that tile. Thus, the use of four intensity levels in addition to a white base level increases the information density of the IIOEIR by 2.3 in comparison to the 2D IIO discussed with respect to FIG. 5.

A similar increase in information content may be realized by using a color scale, as shown in FIG. 6(B). In this example, a white tile may encode a bit value by being changed to any one of a first set 614 of colored tiles, e.g., a cyan tile "C", a magenta tile "M", or a yellow tile "Y". The colors for the first set 614 of tiles may be adjusted to reach more complex colors in a second set 616, for example, by overlaying a tile in the first set 614 with different tones or hues. Thus, a C colored tiled in the first set 614 may be adjusted to be either a blue "B" tile or a green "G" tile in the second set 616. Similarly, an M colored tile may be adjusted to be either a B colored tile or a red "R" colored tile in the second set and a Y colored tile may be adjusted to be either a G colored tile or an R colored tile. Further, each of the tiles in the second set 616 may be adjusted by the addition of a final tone or hue to be a black "K" colored tile.

As for the grayscale tiles, the use of the colored tiles changes the IIO to a three dimensional IIO. Although eight colors are shown, any number of colors may be used, so long as they may be clearly distinguished by the imaging device. As the eight different colors may encode eight bits, the information density of the IIO increases by a factor of Log(8)/Log(2)=3 in comparison to the 2D IIO discussed with respect to FIG. 5.

The use of a portion of the tiles for a second code, e.g., in an embedded information region, may tend to support increasing the size of the IIOEIR, since the increased number of tiles in a larger IIOEIR may provide larger numbers of combinations for the first code. Further, the tiles used for the first code do not have to have the same color or intensity coding as the tiles used for the second code. The tiles used for the second code may be in one color set, while the tiles used for the first code may use a different color set or a larger color or intensity range.

Figure 7:
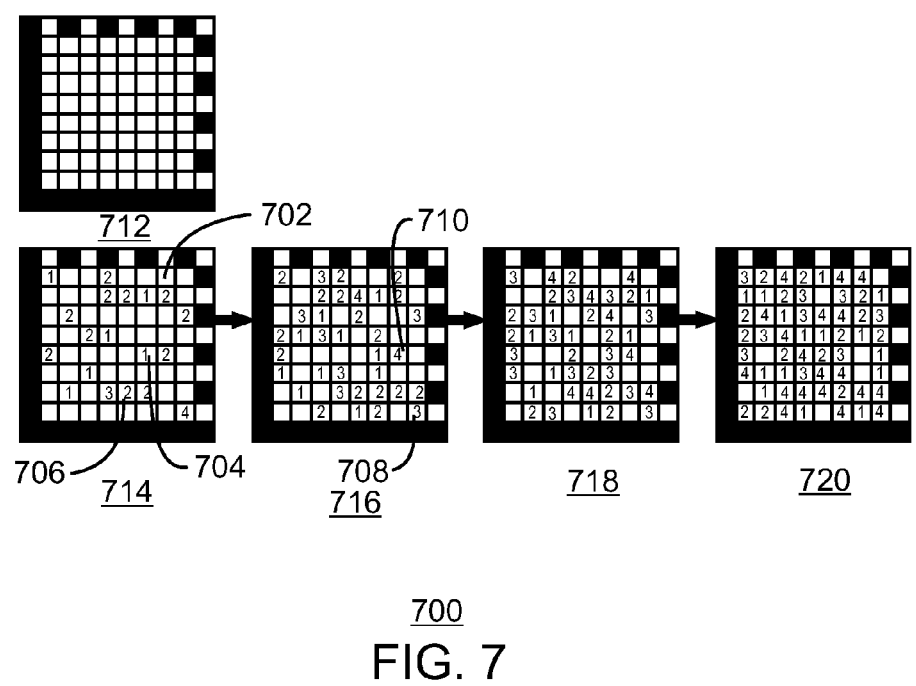
FIG. 7 is a schematic showing an example of changes to tiles that may be seen in combining a two-dimensional IIO, as shown in FIG. 5, with a multi-level gray scale for each tile, as shown in FIG. 6(A), in accordance with an embodiment.

FIG. 7 is a schematic 700 showing an example of changes to tiles that may be seen in combining a two-dimensional IIO, as shown in FIG. 5, with a multi-level gray scale for each tile, as shown in FIG. 6(A), in accordance with an embodiment. Throughout FIGS. 7 and 8, tiles with no number 702 are white tiles, tiles bearing a "1" 704 are at 25% intensity, tiles bearing a "2" 706 are at 50% intensity, tiles bearing a "3" 708 are at 75% intensity, and tiles bearing a "4" 710 are at 100% intensity, i.e., are black. The numbers also correspond to the number of bits, having a bit value of one, which have been written to a tile. Similar changes are seen when using the color scale of FIG. 6(B). As discussed further herein, a portion of the tiles may be assigned to a first code region holding a first code, and other portions of the tiles may be assigned to additional code regions.

In this example, the blank IIO 712 may have 20% of the available storage space overwritten with entropy bits, forming the initial IIO 714. During the first stage of the workflow, the initial IIO 714 may be overwritten with a bitstream taking another 20% of the available storage space in the resulting first IIO 716, which is 40% full. Similar changes in the available storage space may occur after the second stage of the workflow, resulting in a second IIO 718 that is 60% full, and after the third stage, resulting a third IIO 720 that is with 80% full. The remaining 20% may be left blank to provide entropy to the third IIO 720.

The amounts used herein at each stage of the workflow are merely examples, as any percent completion may be used, such as calculated for the two-dimensional IIO discussed with respect to FIG. 5. Further, it may be designed such that the IIO supports step to step statistics which are substantially evenly matched so that the security levels are as identical as feasible throughout the workflow. In an embodiment, a second region of tiles may be used to deliver a second code, which may be used to indicate the proportion of the available storage that has been written in the first code region, as discussed with respect to FIG. 8.

Figure 8:
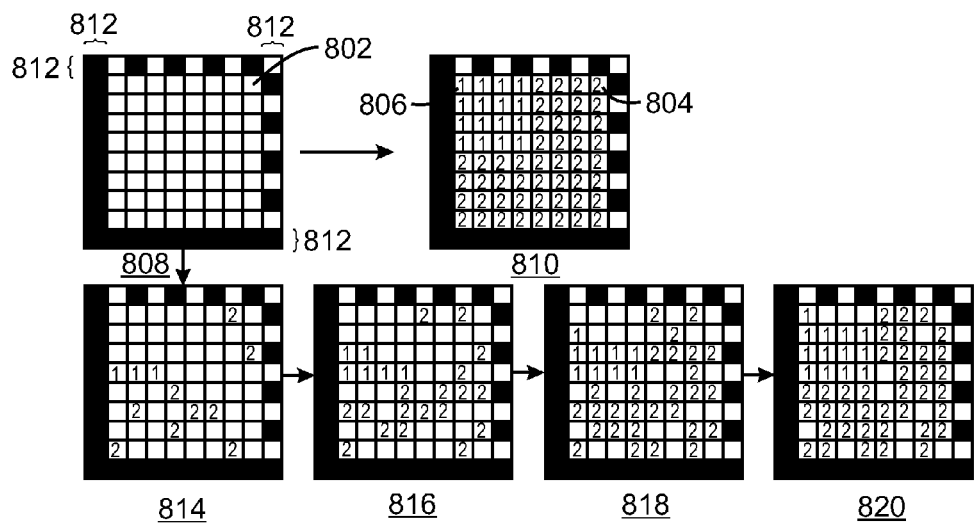
FIG. 8 is a schematic of an IIOEIR showing an example of changes to tiles that may be seen in a first code region and a second code, or embedded information, region as information is sequentially written to the IIOEIR, in accordance with an embodiment.

FIG. 8 is a schematic 800 of an IIOEIR showing an example of changes to tiles 802 that may be seen in a first code region 804 and a second code region 806, which may be termed as an embedded information region, as information is sequentially written to the IIOEIR 800 in accordance with an embodiment. As shown in the schematic, a blank IIOEIR 808 may have NPI carried in perimeter tiles 812, but no payload information, e.g., all white tiles.

Once the blank IIOEIR 808 is fully written, the resulting full IIOEIR 810 illustrates the first code region 804 and the second code region 806. The first code region 804 may include a code that provides information about the product, such as workflow stage, product identification, among other payloads. The second code region 806 may provide additional payload information or may be used to provide information that can be used to confirm the first code. For example, the second code region 806 may provide a measurement of the amount of information stored in the first code region 804. In the example discussed with respect to FIG. 8, the use of "1" and "2" does not indicate any particular number or color, but is merely done to distinguish the individual code regions. As used in this example, each code region 804 and 806 includes tiles that have a binary state, i.e., either holding a "1" or a "2," or being blank.

The blank IIOEIR 808 may have a number of bits written to provide a base entropy, as discussed herein, creating an initial IIOEIR 814, which may be provided to the first workflow stage. In the initial IIOEIR 814, nine tiles of the original 48 tiles in the first code region 804 are set (contain a "2"), giving a completion of 9/48 or 3/16. Accordingly, three tiles in the second code region 806 are set (contain a "1") to indicate the amount of information stored. After the first workflow stage is finished, nine more bits are set in the first code region 804, creating a first stage IIOEIR 816. As 18 bits are set in the first code region 804 of the first stage IIOEIR 816, six bits are set in the second code region 806 to indicate that about 6/16 of the available information space in the first code region 804 is overwritten. The first stage IIOEIR 816 is then passed, with the product, to the second stage of the workflow, as discussed herein.

At the second stage of the workflow, 10 more bits are set in the first code region 804, creating a second stage IIOEIR 818. Since a total of 28 bits are set in the first code region, nine bits are set in the second code region 806 to indicate that about 9/16 of the total available information capacity is occupied in the first code region 804. The second stage IIOEIR 818 is passed to the third stage, during which 10 more bits are written to the first code region 804, creating a third stage IIOEIR 820. In the first code region 804 of the third stage IIOEIR 820, 38 of 48 bits are set. Accordingly, 13 of the 16 bits in the second code region 806 may be set to indicate that the first code region 804 is about 13/16 full. The remaining unset bits in the first code region 804 may be left as entropy bits to make guessing the code more difficult.

The amounts used herein at each stage of the workflow are merely examples, as any percent completion may be used, such as calculated for the two-dimensional IIO discussed with respect to FIG. 5. Further, it may be possible to accommodate an IIOEIR where the step to step statistics are substantially evenly matched so that the security levels are as identical as feasible throughout the workflow.

The information in the second code region 806 may be used to confirm an IIOEIR, for example, by comparing the number of tiles set in the second code region 806 to the amount of information that should be present in the first code region 804. If an IIOEIR has been manually altered, the information content of the first code region 804 may no longer agree with the information in the second code region 806 and the confirmation will fail. Further, the amount of information written at each stage of the workflow will not be general knowledge, making accurate modification of the second code region 804 difficult, even if the purpose of the second code region 804 is guessed. The second code region 804 is not limited to showing the amount of completion of the first code region 804.

Figure 9:
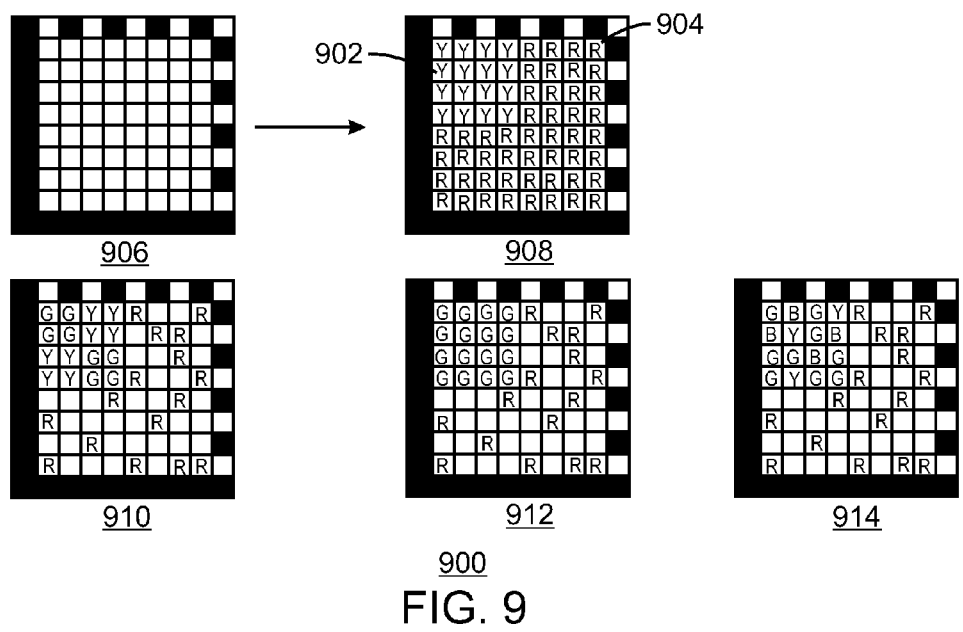
FIG. 9 is a drawing of the use of a second code region to carry other useful data about the IIOEIR that may be independent of the information in the first code region, in accordance with an embodiment.

Any number of other relationships between a first code and a second code may exist, as discussed with respect to FIGS. 9 and 10. In some embodiments, the information in the second code region 806 is independent of the information in the first code region 804. In an embodiment, the information in the second code region may be a scrambled version of the first code region. This can be relatively easily "reverse engineered" from a large set of IIOEIRs, but offers the advantage of being easy to convey to an agent in the field, e.g., a typical rule may be that "the second code region is created by transposing every four bit segment in the first code region." The second code in the second code region may be a parity or bit check version of the first code in the first code region. This is related to replication, but here the data to perform parity checking of the first code can be used, either alone or in some combination (even sampling) of the data in the original.

The techniques are not limited to those discussed above. Any number of other techniques may be used to relate the information in the first code to the information in second code in an IIOEIR. Further, as mentioned herein, the information in the second code may be independent of the information in the IIO.

FIG. 9 is a drawing 900 of the use of a second code region 902 to carry other useful data about the IIOEIR that may be independent of the information in the first code region 904 in accordance with an embodiment. In this example, the information in the second code region 902 may include settings for the reading device that captures the images of the IIOEIR. These settings can include preferred resolution, color palette, contrast, exposure, and the like. In the drawing, a blank IIOEIR 906 shows the payload area, while a filled IIOEIR 908 shows the two code regions 902 and 904. As used in this example, the letters indicate colors, in which "R" represents red, "Y" represents yellow, "G" represents green, and "B" represents blue. Tiles with no letters are assumed to be white. Although particular colors are shown in the drawing 900, any color sequences and layouts may be used. The location of the tiles indicates their interpretation.

As an example, a first IIOEIR 910 may indicate settings by 2×2 tile patterns in the second code region 902, allowing cameras with lower resolving power to still read the pattern successfully. For example, this may be used to indicate that the data in the IIOEIR is at a higher resolution than the current camera can detect or to trigger the camera to switch to higher resolution settings. Further, the data may be used to allow only certain readers or types of readers. As used herein, a lower resolution camera may not be capable of fully resolving all tiles or all colors within tiles in an IIO, while a higher resolution camera may be capable of reading all tiles and all colors within tiles of an IIO.

If there are four colors used in the 2×2 tile pattern shown for the second code region 902 of the first IIOEIR 910, such as YRBG (as shown) or a CMYG (cyan-magenta-yellow-green) color scheme, then this pattern may provide 4 squares×4 possible colors at each square, or 256 possible patterns, each of which may indicate a specification setting. In should be noted that a random code is shown in the first code region 904 of the first IIOEIR 910, as well as in the second IIOEIR 912 and third IIOEIR 914. The random code is merely an example, and is not necessarily related to the information in the second code region 902 of the respective IIOEIR 910, 912, or 914.

Another example of using colors to carry settings is shown in a second IIOEIR 912. In the second IIOEIR 912, a single color, green, is used for the specification setting. If six colors are used, than only six different specification settings can be indicated.

In a third IIOEIR 914, multiple colors in tiles in the second code region 902 may be used to convey multiple specification settings. Here, the overall 4×4 tile grouping of the second code region 902 has a mean chroma of green. Accordingly, the tile may be used to convey a small number of settings to a lower-resolving power camera, while the variations among individual tiles may represent many different settings for higher-resolving power cameras. Such settings may include contrast, exposure, color balance, field of view, lighting or strobing, and the like.

FIG. 10 is a drawing 1000 illustrating the use of a third code region 1002 to convey information about the relationship between a first code region 1004 and a second code region 1006 in accordance with an embodiment. In the drawing 1000, a blank IIOEIR 1008 may have three code regions 1002, 1004, and 1006, as shown by the full IIOEIR 1010. In some embodiments, a first code region 1004 may contain information about a product or workflow, while a second code region 1006 may contain information that is related to the first code region 1004, such as a scrambled version, or a space filled version. The third code region 1002 may then provide the relationship between the first code region 1004 and the second code region 1006, allowing more flexibility in the implementation. For example, a first pattern in the third code region 1002 may indicate that the second code region 1006 includes a scrambled version of the first code region 1004, while a second pattern may indicate that the second code region 1006 is an encrypted version of the first code region 1004, and so on.

In other embodiments, the data streams written to the first code region 1004 and the second code region 1006 may be independent data streams, in which case, the third code region 1002 may be used to indicate the source for the two streams. For example, a first pattern may indicate that they are both created from nonces, while a second pattern may indicate that they are both created from mass serialization lists, and so on.

As examples that may show relationships between code regions, six IIOEIRs 1012-1022 are shown, in which the pattern in the third code region 1002 in each IIOEIR 1012-1022 indicates a different relationship between the first code region 1004 and the second code region 1006. The colored tiles in the first code region 1004 and second code region 1006 are examples, and are not intended to convey specific data. Further, the six patterns shown are not indicative of any particular relationship that may indicate the relationship between the two data fields.

Any number of possible relationships may be used in embodiments. Relationships that may be present include replication, scrambling, bit-check/parity-check, compression, signing, and encrypting. For example, the information in the second data stream written, into the tiles of the second code region 1006 can be the order-specific replication of the data in the first data stream, written to the tiles in the first code region 1004. Further, the second data stream can be a scrambled version of the first data stream. This can be relatively easily decoded if a set of IIOEIRs are available, but it offers the advantage of being easy to convey to an agent in the field. For example, through a rule such as "the second stream always juxtaposes the 3rd and 4th fields and the 9th and 16th fields of the first stream.

Other relations may also be used. In a similar fashion to replication, the data in the second stream may be a parity check of the data in the first stream, either alone or in some combination (even sampling) of the data in the first stream. Since data streams used to write the IIOEIRs typically compress well, the second data stream can represent a compressed version of the first data stream. Further, the second data stream may be a digitally signed version of the first data stream.

Generally, the data streams would not be related through direct encryption, because, if the second data stream is an encrypted version of the first data stream, then the first data stream would be useful in a plaintext attack on the encryption. Instead, both data streams may be encrypted from a common source, such as using a two-part nonce, a single stream and its scrambled form, a single stream and its signed form, and the like.

The third code region 1002 may also be used as a connection between the IIOEIR and a second, associated mark. In this case, the data in the third code region 1002 can be used to indicate whether the two marks are related through replication, scrambling, parity checking, compression, signing, encryption, and the like. The associated mark may be another IIO, a normal barcode, guilloches, a digital watermark, etc., displayed in proximity to the IIOEIR. For example, a pie chart indicating the amount of information contained in one or both code regions may be placed in proximity to the IIOEIR.

Finally, there can be many different types of non-payload indicia (NPI) associated with the progressive barcode. For example, the blank IIOEIR 1008 has only non-payload indicia set. As discussed herein, the NPI may include the perimeter pixels on all four sides, and are used for skew, orientation and color/contrast calibration. However, other non-payload indicia tiles may include multiple indicia for color calibration to provide readability to a wide array of imaging devices. Further, NPI may be used as "mobile commerce" bits, e.g., allowing couponing, click through to website, and the like.

NPI are not limited to the perimeter of the IIOEIR 1008. In an embodiment, a pie chart may be included within an IIOEIR, for example, in place of the tiles in the third code region 1102, to indicate the progression of the workflow. The pie chart may be filled proportionally to the percent of the IIOEIR that is filled with data. This is in a similar manner to the percent "filledness" used in the second code region 806 of FIG. 8. Other graphical items may be used to carry data in place of tiles. For example, a region of tiles may be replaced with a rectangular area that can be sequentially filled to indicate the percent of the IIOEIR that is filled with data.

Figure 11:
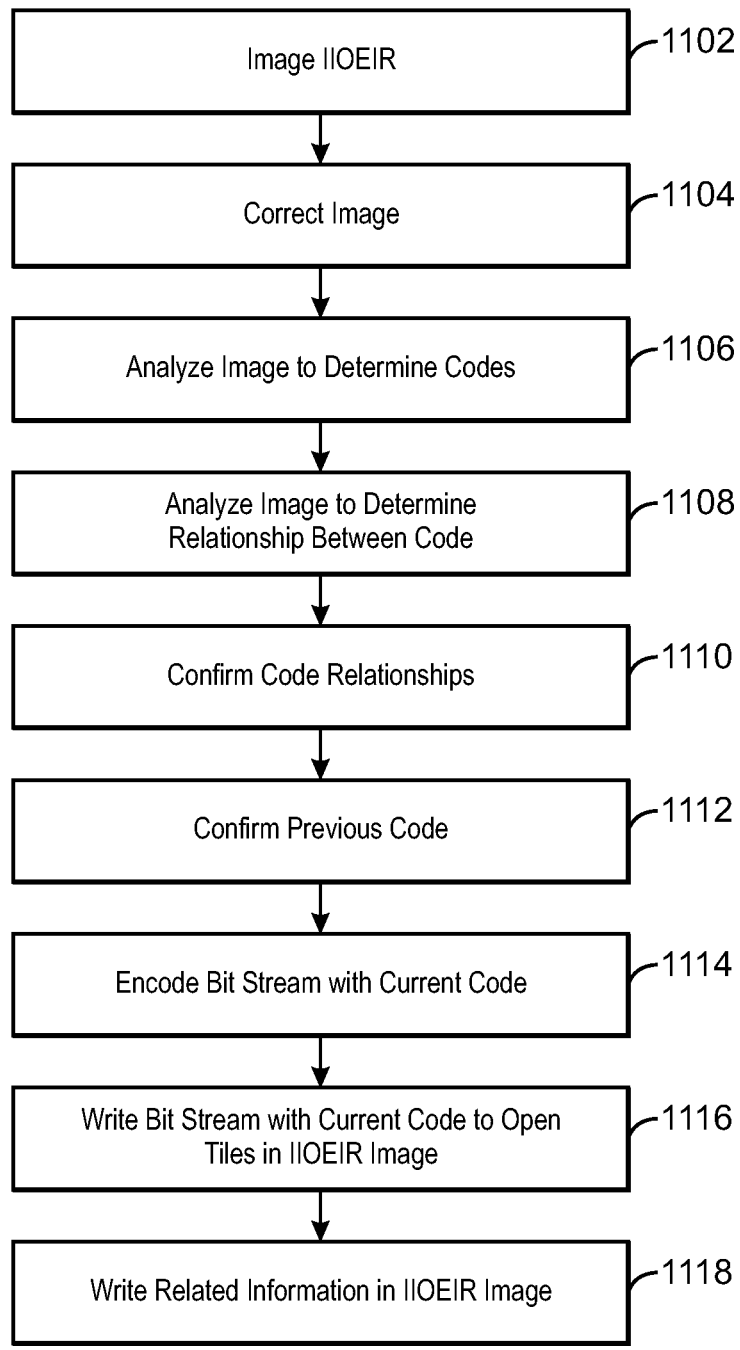
FIG. 11 is a flow diagram of a method for generating, an IIOEIR in accordance with an embodiment.

FIG. 11 is a flow diagram of a method for generating an IIO in accordance with an embodiment. Referring also to FIG. 1, prior to configuring the system 100 and its various components to generate an IIOEIR, the stages of the workflow can be set and a number of bits to write in total and during each state of the workflow can be selected. In some instances, however, the number of bits may be dynamically determined at any stage in the workflow. For example, if additional bits need to be added for security at a stage of the workflow that takes place outside of a secure environment. In one embodiment, an IIOEIR may be selected first and then the workflow and number of bits may be designed around the selected IIOEIR. In another embodiment, the workflow and the number of bits may be selected, and then the IIOEIR may be selected to fit the specifications of both the workflow and the total number of bits to be carried. For example, the IIOEIR may contain all the tiles needed for every step in the workflow upon creation of the IIOEIR.

In embodiments in which the IIOEIR is selected after the total number of bits is identified, the identifying object registry 104 may consider the total number of bits to be written to the IIOEIR and whether it is desirable to include entropy in the identifying object. At this stage, other considerations may also be taken into account, such as to include non-payload indicia in the identifying object, the number of code regions to be used to form the IIOEIR, and the relationships between the code regions.

The probability of guessing the initial state with less than a specified statistical probability may be added prior to the initiation of the workflow by partially filling available tiles of the IIOEIR. It can be understood that a partially completed state of the IIOEIR has greater security (statistically) than an all-white state of the IIOEIR. Thus, in the embodiments disclosed herein, the variability, or so-called "entropy," can be modified by the writing of an initial bitstream, so that the number of non-white tiles is p, where $0<p<1$, the number of twice-altered tiles is roughly $p^2$, etc.

The introduction of non-payload indicia (NPI) may also affect the size of the IIOEIR because non-payload indicia are included in tiles of the IIOEIR that may have otherwise been written to with bits. As described above, NPI do not contain bits, but rather are used for calibration, for example, to correct skew, calibrate intensity, and calibrate orientation of the IIOEIR, at each stage in the workflow. NPI may also be used for branding, symbology identification, or the like. When it is desirable to include NPI, the number of tiles to be used for the NPI may be accounted for in the total number of tiles that are used for the IIOEIR.

In one embodiment, the IIO, the code regions, the workflow, and the number of bits are created at the identifying object registry 104. The identifying object registry 104 includes a non-transitory, computer-readable medium with a computer program for selecting the IIOEIR, a number of stages in the workflow, a security level for each stage in the workflow, and a number of bits to be written at each stage in the workflow. The number of elements may be preselected before the workflow is initiated or dynamically determined as the workflow is in progress.

The workflow and preset number of bits may be set or defined using information received at the identifying object registry 104 from one or more participants in the workflow. For example, a product manufacturer may request that a workflow be set up for a particular product, and may provide information to define the workflow, including such information as the distributor, the retailer, and product identification information, such as the serial number. The identifying object registry 104 may then select a suitable IIOEIR, generate a suitable workflow, and preset first code region information and the information to be stored in an associated second code region based upon the information from the first code region. The IIOEIR and the preset number of bits may also be set by the workflow and, thus, can be accessed (or looked up) using a number of methods.

In the embodiment described with respect to FIGS. 1-5, the workflow may involve three stages, for example, a manufacturer, a distributor, and a retailer. At each stage, the workflow may require an individual to sign a document, such as by overprinting the IIOEIR associated with the product, prior to shipping the product and document to the next entity, and may require an individual at the receiving end to sign the document upon receiving the product and document.

As described herein, the number of bits to write to the IIOEIR at each stage of the workflow is proportional to the desired minimum level of security, on a statistical basis, at any given stage. High-level security stages may write more bits of information to the IIOEIR, while low-level security stages may write less bits of information to the IIOEIR. The number of bits to encode at each stage of the given workflow may be based on probability. For example, what level of confidence is needed so that the next state of the IIOEIR has less than a p probability of being guessed.

Hamming distance may also be used in the determination of the number of bits. As described herein, Hamming distance is the sum of bits, defined in the (aligned) elements of the IIOEIR that are different from one stage to the next. Any associated mark that is used in concert with the IIOEIR may also be used to determine the number of bits, as an associated mark may increase the complexity of the IIOEIR, making guessing a code in one of the code regions less probable.

Once the workflow is generated, including the various stages and the number of bits to be encoded in total and at each stage, and the IIOEIR is selected, the workflow is initiated. The workflow instructions may be transmitted electronically to at least the first stage system 102. The instructions may include, for example, the procedural rules for the transmission of the product, the actions, or purposes associated with the product, and either the total number of bits to encode or the number of bits to encode in the product's IIOEIR at each stage in the workflow. Further, the workflow instructions may include rules for creating the individual code regions in the IIOEIR.

In one embodiment, the systems used during subsequent stages in the workflow receive the instructions from the first stage system 102 or from a system used in previous workflow stage. In another embodiment, the systems 108 or 110 used during subsequent stages in the workflow may retrieve the instructions from the identifying object registry 104, for example, via a network 106. In another embodiment, the workflow may be initiated without transmitting the workflow instructions. For example, the document and its associated IIOEIR may be transmitted to the first stage system 102 in the workflow. It is to be understood that as long as the starting point of the workflow is known, one can deduce each stage of the workflow.

The method starts at block 1102 by imaging an IIOEIR. The imaging may be performed by a bar code reader 130, a software object, a scanner, a camera, or any other suitable imaging device or code. The IIOEIR is isolated or segmented from the surrounding content, such as by the use of non-payload indicia (NPI) that delineate the edges of the IIOEIR. At block 1104, an image correction and calibration is performed. Calibration may involve orienting the IIOEIR using the non-payload indicia, dewarping the IIOEIR, deskewing the IIOEIR, calibrating the possible intensity levels, and the like. The calibration may be performed in conjunction with interpretation of the IIOEIR, or calibration may be performed and then interpretation of the IIOEIR may be performed.

At block 1106, the image may be analyzed to determine the previous codes in the individual code regions of the IIOEIR. As noted herein, the interpretation and decoding of the individual code regions is based on a prior knowledge of the boundaries of the individual code regions, e.g., the interpretation of a tile is based on its location in the IIOEIR. The codes may then be identified by incrementally determining the bits written to the tiles to generate a bitstream. For example, the bitstream may be determined by reversing a procedure used to write the bits. The bitstream may then be decoded using a public key to decode a bitstream encoded with a corresponding private key. Any number of techniques may be used to encode and decode the data between workflow stages, including the private/public key system, generation of an encoded numerical hash of the code, and the like. Further, in some embodiments, an identifying object registry 104 may be used to confirm the bitstream without further decoding, such as if a code region in the IIOEIR effectively stored a secret string, nonce, or the like.

At block 1108, the relationships between information, or codes, stored in separate code regions may be determined. For example, if a third code region is used to indicate a relationship between codes written to other code regions, this may be used to look up an expected relationship, as discussed with respect to FIG. 10. In some embodiments, for example, if only two code regions are used, the relationship between codes in different code regions is fixed before the IIOEIR is written.

At block 1110, information from another code region, such as the second code region 806 of FIG. 8, may be used to confirm the code from a first code region in the IIOEIR. This may be performed by testing the relationships discussed with respect to FIG. 10, among others. For example, if the first code region includes more information than a percentage of completion indicated by a second code region indicates, than the IIOEIR fails the confirmation. In some embodiments, the information in the second code region may be independent of the information in the first code region. In these embodiments, the information in each may be independently used or confirmed.

At block 1112, the code may be confirmed to validate the identity of the document, or product, and the previous stage. For example, this may be performed by querying the identifying object registry 104 with the bitstream. The code from other code regions may also be sent. In some embodiments, the confirmation may be performed by comparing the decoded value to an expected value at a local stage system.

Once the confirmation has been performed, at block 1114 new bitstreams may be generated for the code regions with current codes, for example, related to the current work stage. The new bitstreams may include an encrypted version of a hash, for example, generated using a private key. In some embodiments, a new bitstream for a first code region may be obtained from an identifying object registry 104 along with the information for creating bitstreams for other code regions.

At block 1116, a new bitstream may be written over the first code region in the current IIOEIR. The stage system 102, 108, or 110 performing the incremental writing may determine the location of remaining available candidate areas that can be written to, for example, tiles that are not already carrying NPI or are full. A variety of algorithms may be used to determine where to place the information, which may include a preset number of bits. Non-limiting examples of these algorithms include scrambling, random/nonce, one-time-pad, encryption, data replication, etc. These techniques identify where the information can be added to the first code region. This may include identifying open tiles for data in the first code region and writing the bitstream to the open tiles.

In one embodiment, after the available candidate areas in the first code region are identified, the first stage system 102 identifies or retrieves the preset number of bits, for example, from the workflow instructions, to be written. In some embodiments, the number of bits to be written at a particular stage may be determined automatically by the stage system 102, 108, or 110 performing the incremental writing or by a user. In these embodiments, the total number of bits to be encoded throughout the workflow is known, and the stage system 102, 108, or 110 at each workflow stage would add a suitable amount of information to the first code region. For example, a string containing 0's and then 1's incrementally to be written could be stored as a nonce and then the 1's would be incrementally written to the first code region stage by stage.

When determining how to write the information, the stage system 102, 108, or 110 will use the information from segmentation to identify the then-current intensity levels of the available candidate areas of the first code region. When determining how to write the information, the stage system 102, 108, or 110 will select a scrambling technique by identifying an algorithm to be used for incorporating the information for the current workflow stage. This algorithm may be random or nonce-based, or may be deterministic.

In instances where the workflow 200 is based on the identifying object registry 104, as discussed with respect to FIG. 2, the previous state of the first code region may be replicated using the network 106, so that random or nonce methods are valid when inputting new information. For example, the information to be added is provided by a random number generator and is stored in the identifying object registry 104. In this example, the newly added bits are randomly added, and the identifying object registry 104 can provide and store the random new bits.

In instances where the independent incremental workflow 300 is used, as discussed with respect to FIG. 3, each workflow stage may use an intelligent hash of the previous state of the code in the first code region. In this example, a deterministic approach may be used, in which the newly written information is determined from the current state of the first code region and any additional pre-populated information that distinguishes the IIOEIR from other IIOs on the product, such as SKU specific information and mass serialization information. In one embodiment, the first code region within the IIOEIR may be pre-populated with the SKU specific information and mass serialization information to ensure each IIOEIR is unique. In another embodiment, if a document has other unique information, such as a routing number or another barcode/stock identifier for point of sale, the other unique information can be included in a digital signature, such as the output of an operation on a binary string using a private key, to create the next set of bits to write to the first code region.

When determining how to write the information, the stage system 102, 108, or 110 will also select a manner in which the state change results in a predictable change in the first code region. In one embodiment, this may be accomplished when a binary string representation of the current state of the IIO is transformed with a security string, such as by using a private key to encrypt a binary string. When determining how to write the information, the stage system 102, 108, or 110 will also identify a writing scheme, for example, as described above with respect to FIG. 8, which may be suitable for the then-current stage of the workflow.

The stage system 102, 108, or 110 performing the incremental writing at workflow stage I then writes the information to the first code region to form a new IIOEIR. When writing, the stage system 102, 108, or 110 may use the incremental intensity or color process, the selected scrambling technique, the selected manner for achieving a predictable state change, and the selected writing scheme to write the information to the first code region. During each writing stage in the workflow, previously written information is not generally removed or changed, but rather the additional information is added, changing the state of the first code region.

While the number of bits to be written is preset in one embodiment, the actually writing of the information may take place dynamically as the workflow progresses. As such, the candidate areas that are actually written to are determined in real time according to, in part, the areas available for writing, the number of bits to be written and the algorithms to be used.

At block 1116, a similar process may be used to overwrite information to other code regions, or marks, in the IIOEIR. For example, another code region in the IIOEIR may indicate the amount of information carried in the first code region, as discussed with respect to FIG. 8. In other embodiments, new parity bits may be calculated and text characters, or other marks, indicating the parity of a first code region in the IIOEIR may be written over the second code region of the IIOEIR.

The product and the IIOEIR, such as a document, can be printed and stored. When the IIOEIR is manifest in physical form (i.e. printed), the document with the IIOEIR printed thereon as it was received can be overprinted so that the newly written to areas will be filled in the printed version. When the IIOEIR is physical and electronic, the electronic version of the document and the incrementally-written IIOEIR can be reprinted or overprinted, if desired. When the incrementally-written IIOEIR is saved, it is to be understood that it will replace any prior versions of the IIOEIR.

The product and incrementally written to IIOEIR are then shipped, electronically or physically, to the next entity in the workflow, such as workflow stage II system 108, as described with respect to FIG. 1. Similarly, when the action, task, etc. set forth in the workflow stage II instructions have been performed, the IIOEIR is incrementally written to according to the workflow stage II instructions, for example, following the same method 1100. The document and its incrementally-overwritten IIOEIR can then be printed and stored by the stage three system 110, which adds its increment to the IIOEIR.

At each stage, the previous states of the IIOEIR are still provable because there are no new available candidate areas in the later stages of the IIOEIR. In embodiments where the stage system 102, 108, or 110 at a stage in the workflow has access to all the rules governing writing at the previous stages, the stage system 102, 108, or 110 can automatically check all previous states of the IIOEIR for validity when checking the then-current state.

In any of the embodiments disclosed herein, if multiple identifying objects are part of the same shipment, it may be desirable to have the same pre-filled set of data bits. Embodiments of the IIOEIRs disclosed herein retain the set real estate on a document even though information is incrementally written thereto throughout a workflow. The state of the IIOEIR and the then-current stage of the workflow may be determined directly from the intensity of the tiles and the percentage of the tiles that are filled in or saturated, even without knowing how to interpret the data embedded therein.

Figure 12:
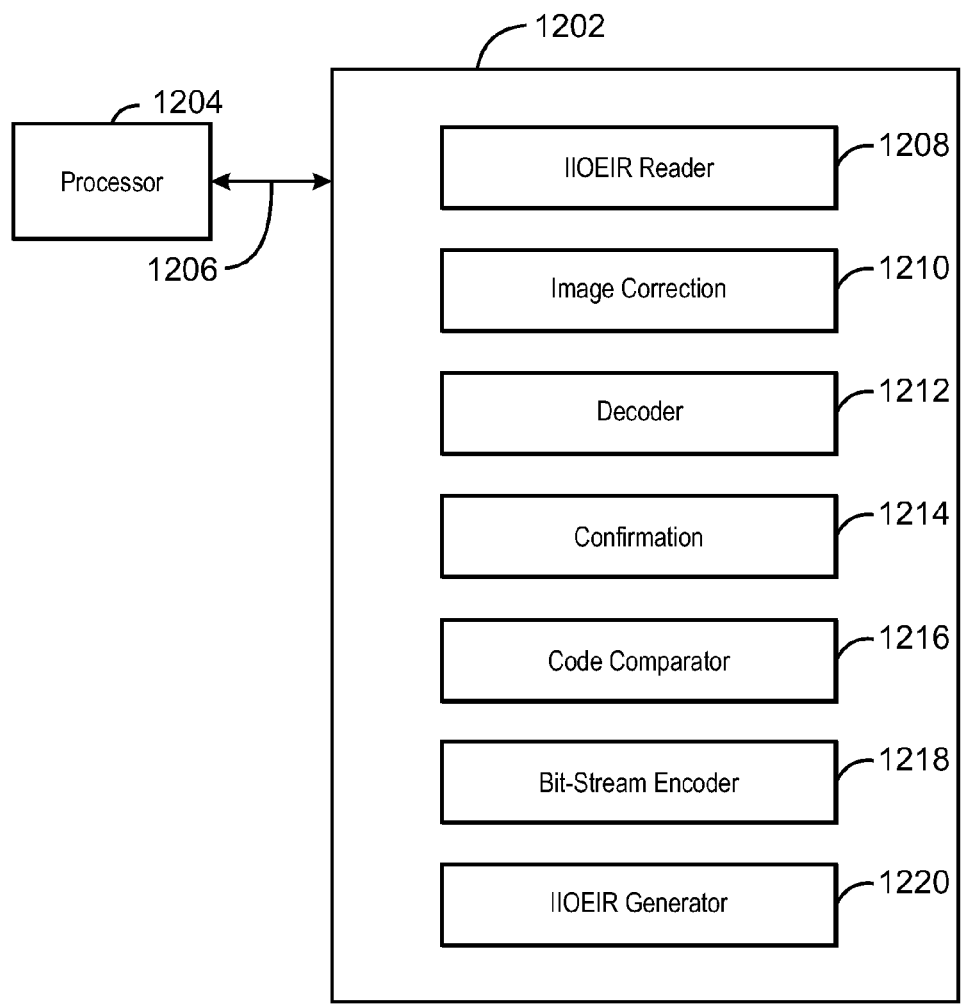
FIG. 12 is a block diagram of a non-transitory, computer readable medium containing code for generating an IIOEIR, in accordance with an embodiment.

FIG. 12 is a block diagram 1200 of a non-transitory, computer readable medium 1202 containing code for generating an IIOEIR in accordance with an embodiment. A processor 1204 may access the non-transitory, computer readable medium 1200 over a bus 1206, or other communication system, to obtain code configured to direct the processor 1204 to confirm a product based on an IIOEIR associated with the product. The non-transitory, computer readable medium 1202 may include any combination of read only memory (ROM), random access memory (RAM), hard drives, optical drives, RAM drives, or flash drives.

The non-transitory, computer readable medium 1202 may include a module 1208 to read an IIOEIR and a second module 1210 to correct the image and calibrate the reader. Another module 1212 may decode the IIOEIR to generate a first bitstream. A module 1214 may confirm the code, for example, by following the instructions that should have resulted in the current IIOEIR, or by accessing an identifying object registry. The confirmation module 1214 may work with another module 1216 to confirm the IIOEIR by comparing the information in the first code region to the information in other code regions. A bit-stream encoder module 1218 may generate the codes needed to create the IIOEIR. Another module 1220 may then identify open tiles in the code regions of the IIOEIR and overwrite the additional information onto the IIOEIR.

What is claimed is:

1. A system for generating an incremental information object (IIO) with an embedded information region (IIOEIR), comprising:
   a processor; and
   a memory, wherein the memory comprises computer readable code configured to direct the processor to:
   analyze an IIOEIR, wherein the IIOEIR comprises a plurality of tiles, wherein a first region of the plurality of tiles comprises a first code and a second region of the plurality of tiles comprises a second code, wherein the IIOEIR comprises a third code that defines the relationship between the first code and the second code;
   confirm the first code, and, if the confirmation succeeds:
   generate a new first code comprising a bitstream; and
   overwrite the bitstream onto the first region;
   generate a new second code; and
   overwrite the new second code onto the second region.

2. The system of claim 1, wherein the first code is confirmed by comparing the first code to the second code.

3. The system of claim 1, wherein a tile within the IIOEIR represents encoded data by differing levels of intensity, differing colors, or both.

4. The system of claim 1, comprising a device configured to overprint the bitstream onto an IIOEIR physically located on the product.

5. The system of claim 1, comprising a handheld device, a mobile device, or a bar code reader configured to read the IIOEIR.

6. The system of claim 1, wherein the memory comprises computer readable code for setting entropy in the IIOEIR at a start of a workflow.

7. The system of claim 1, wherein the second code comprises an indicator of the amount of information stored in the first code.

8. The system of claim 1, wherein the memory comprises computer readable code for setting non-payload indicia (NPI) in the IIOEIR.

9. The system of claim 1, wherein the second code comprises a parity check of the first code.

10. The system of claim 1, wherein the second code comprises a compressed version of the first code.

11. The system of claim 1, wherein the third code is embedded in the second region of tiles.

12. The system as defined in claim 11, wherein the third code and the second code comprise hues in a single color family, and wherein the third code of tiles is visible to a high resolution imaging device.

13. A method for generating an incremental information object (IIO) with an embedded information region (IIOEIR), comprising:
   analyzing an IIOEIR, wherein the IIOEIR comprises a plurality of tiles, and wherein a first region of the plurality of tiles comprises a first code and a second region of the plurality of tiles comprises a second code;
   identifying a third code in a third set of the plurality of tiles, wherein the third code indicates a relationship between the first code and the second code; and
   confirming the first code, and, if the first code is confirmed:
   generating a new first code comprising a bitstream;
   overwriting the bitstream on the first region;
   generating a new second code related to the first code; and
   overwriting the second region with the new second code.

14. The method of claim 13, wherein confirming the IIOEIR comprises, at least in part, comparing the first code to the second code.

15. The method of claim 13, comprising using the relationship to compare the first code to the second code.

16. A non-transitory, computer readable medium comprising code configured to direct a processor to:
   image a document to obtain an incremental information object (IIO) with an embedded information region (IIOEIR), wherein the IIOEIR comprises a plurality of tiles;
   analyze the IIOEIR to identify a first code and a second code, wherein a first region of the plurality of tiles comprises the first code and a second region of the plurality of tiles comprises the second code;
   analyze the IIOEIR to identify a third code in the IIOEIR, wherein a third set of the plurality of tiles comprises the third code and the third code indicates a relationship between the first code and the second code; and
   confirm the first code, and, if the first code is confirmed:
   generate a new first code comprising a bitstream; and
   overwrite the bitstream onto the first region;
   generate a new second code, wherein the new second code is related to the new first code; and
   overwrite the new second code onto the second region.

17. The non-transitory, computer readable medium of claim 16, comprising code configured to direct the processor to confirm the first code by comparing the first code with the second code.

\* \* \* \* \*